UNITED STATES PATENT OFFICE.

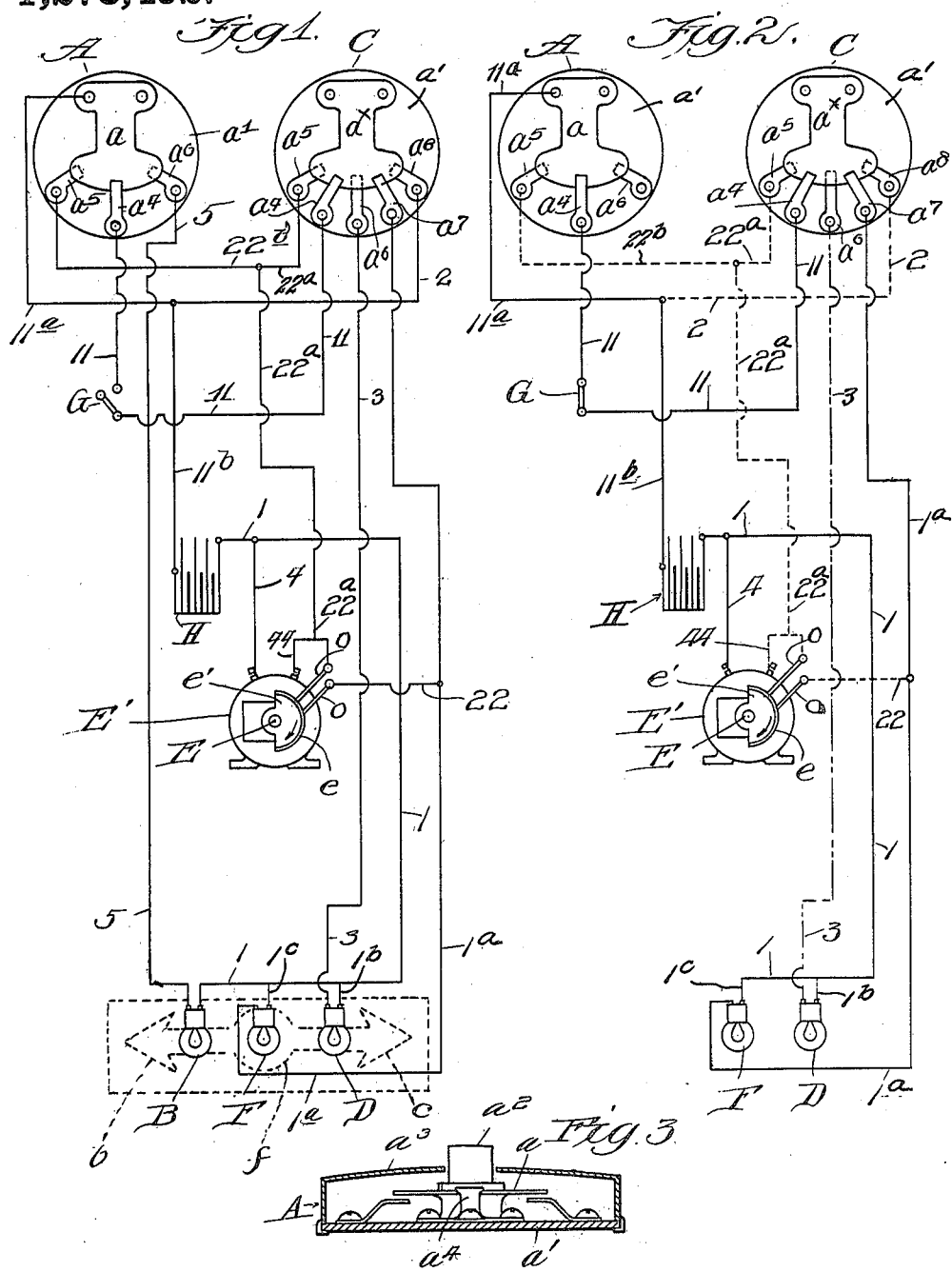

MAX A. MILLER, OF MAYWOOD, ILLINOIS.

SIGNALING SYSTEM FOR MOTOR-VEHICLES.

1,278,492. Specification of Letters Patent. Patented Sept. 10, 1918.

Application filed July 23, 1917. Serial No. 182,229.

*To all whom it may concern:*

Be it known that I, MAX A. MILLER, a subject of the Emperor of Germany, and a resident of Maywood, county of Cook, and State of Illinois, have invented certain new and useful Improvements in Signaling Systems for Motor-Vehicles, of which the following is declared to be a full, clear, and exact description.

This invention relates to systems for controlling and operating signal apparatus for motor vehicles, and is in the nature of an improvement upon the system described in Letters Patent of the United States granted to me on January 2, 1917, No. 1,210,966. The construction and general arrangement of the signaling devices constituting the mechanism of the present invention may in the main comprise substantially the same parts as those described in my prior patent, but the present invention has more particular reference to the system for controlling the apparatus.

In the present system "right" and "left" direction indicating lamps are employed for indicating change of direction of movement of the vehicle, which lamps are placed behind transparent portions of a lamp housing. A tail light lamp is located between said "right" and "left" lamps, and behind a red lens, all of said lamps being controlled from buttons located in positions convenient to the driver, and preferably on the steering wheel. By pressing the proper button, the driver may signal to any one following the vehicle, his intention to turn to the right or left or to stop. The present invention includes a tail light lamp, which, during day light, normally may be extinguished, and at dark normally may be illuminated, but which, under either condition, gives out a series of flashes when either button is pressed.

The principal object of the present invention is to simplify automobile signaling systems, to dispense with one of the incandescent tail light lamps, and to otherwise improve upon signaling systems of this character.

The invention consists in the several novel features hereinafter fully set forth and claimed.

The invention is clearly illustrated in the accompanying drawing, in which:

Figure 1 is a diagrammatic view of a simple embodiment of the invention; Fig. 2, is a diagrammatic view of the circuits for the "right" hand signaling lamp, and tail light lamp illustrating the circuits in action, when the tail light lamp (under normal conditions) is steadily illuminated; and Fig. 3, is a diagrammatic, sectional view of a push button used in the system.

Referring to said drawings, the reference character A, designates a push button for controlling the lamp B, which is the one for illuminating that part of the direction indicating signal pointing toward the left, and C, designates the push button for controlling the lamp D, which illuminates the part indicating or pointing toward the right. For the sake of convenience, the push button A, will hereinafter be termed the "left" hand button, and the push button C, will be termed the "right" hand button. The lamps B, and D, will be termed the "left" and "right" signal lamps respectively. As in my other signal apparatus for motor vehicles, disclosed in Patent No. 1,210,966, the push buttons may, for the sake of convenience be secured in the rim of the steering wheel of the vehicle.

A rotary shaft E, rotates a contact piece $e$, which if desired, may be fastened to a block $e^1$, of non-conducting material, mounted on the shaft E, and said shaft may be any continuously running shaft of the motor vehicle—that is, any shaft which runs continuously while the motor is in operation. It is here shown as driven by an electric motor $E^1$, and speed reducing gearing of any well-known character is interposed between the prime mover (the motor) and said shaft E, whereby the latter is driven at a relatively slow speed as compared with that of the motor. The ordinary worm gear serves the purpose of reducing the speed between the motor and contact piece.

Contact pieces or brushes $o$, $o$, make contact with the contact piece $e$, as it passes by them, thereby intermittently closing a circuit through the tail light lamp and causing a series of flashes so long as either push button is depressed. The rotating contact piece $e$, and brushes $o$, $o$, will be termed a "circuit interrupter," as the function of these parts is to interrupt the tail light lamp circuit.

The motor may be secured to any suitable part of the motor vehicle, as is well understood.

The reference character F, designates the rear or tail light lamp carried behind the center lens as before, which at dark, remains illuminated under normal conditions, but when the signal is operated to indicate a change of direction of movement of the vehicle, said lamp gives out a series of flashes to attract the attention of any one following the vehicle. During daylight, the main circuit to the tail light lamp is broken, but when the circuit through either "right" or "left" lamp is closed, a circuit is simultaneously closed through the tail light lamp, which circuit is automatically interrupted to produce the flashes before referred to.

As in my prior patent, the lamps are inclosed in a lamp housing secured to the vehicle, which housing has two transparent direction indicating parts, as for instance, arrows of glass $b$, $c$, which are immediately in front of the lamps B, D, and said housing has also a central lens $f$, located immediately in front of the lamp F. In accordance with the usual custom, the color of the lens $f$, is red.

Before describing the various circuits, I shall explain the construction of the push buttons. Referring first to the "left" button; a resilient, or spring-like contact piece $a$, is supported by a base $a^1$, of non-conducting material. The tension of the spring is exerted in an upward direction, and the contact piece may be depressed by a button $a^2$, resting on the spring contact piece $a$, and held in place by the cover $a^3$, of the push button. Secured to the base is a second contact piece $a^4$, whose free end overlies the free end of the contact piece $a$, and normally makes contact therewith. Two other contact pieces $a^5$, $a^6$, are secured to the base and underlie the contact piece $a$. When the button $a^2$, is depressed, contact is made between the contact piece $a$, and both contact pieces $a^5$, $a^6$, and at the same time the contact between contact pieces $a$, $a^4$, is broken.

The "right" push button has contact pieces $a^x$, $a^4$, $a^5$, $a^6$, corresponding to the contact pieces $a$, $a^4$, $a^5$, $a^6$, of the "left" push button, and in addition thereto, it has two contact pieces $a^7$ $a^8$, one overlying the contact piece $a^x$, and one underlying the same. Normally the contact piece $a^x$, is in contact with the contact pieces $a^4$, $a^7$, and when depressed, said contact is broken and contact is made between the contact piece $a^x$, and the contact pieces $a^5$, $a^6$, $a^8$.

I will now trace the circuit for the tail light lamp F. This circuit has a switch G, which is closed at dark, to close a circuit through said lamp, and thereby cause illumination thereof under normal driving conditions. Referring to Fig. 2, where the switch G, is shown closed, the circuit for lamp F, may be traced, as follows:

Starting with the source of electric energy which may be a battery H, a conductor 1, leads from one terminal of the battery and runs through branch $1^c$ to the tail light lamp F, then through conductor $1^a$ to contact piece $a^7$, of "right" button C, through contact piece $a^x$, to contact piece $a^4$, through conductor 11, switch G, contact pieces $a^4$, $a$, of button A, and conductor $11^a$, $11^b$, back to the other terminal of the battery. During daylight, switch G, is thrown open and the circuit just described remains open.

The "right" or "left" signaling lamp may be illuminated, and a series of flashes may be caused in the tail light lamp by pressing the proper push button. The circuits controlled by the "right" button (when the switch G, is closed) will now be traced. (See Fig. 2.)

The contact piece $a^x$, having been depressed into contact with contact pieces $a^5$, $a^6$, $a^8$, the continuous circuit through the tail light lamp is broken because contact between contact pieces $a^x$, $a^4$, $a^7$, is broken, and an interrupted circuit takes its place. Starting with contact piece $a^8$, this circuit may be traced through conductors 2, $11^b$, battery H, conductor 1, branch $1^c$, through lamp F, conductor $1^a$, to branch 22, then through the brushes $o$, $o$, and contact piece $e$, of the circuit interrupter, through conductor $22^a$, to contact pieces $a^5$, $a^x$, $a^8$. Assuming that the "right" button is being depressed, the circuit through the steadily illuminating "right" lamp D, is closed, and said circuit may be traced from contact piece $a^8$, conductors 2, $11^b$, battery H, conductor 1, branch $1^b$, through lamp D, conductor 3, to contact pieces $a^6$, $a^x$, $a^8$.

When an electrically operated circuit interrupter is employed, it may be interposed in the circuit traced from battery through conductor 1, to branch conductor 4, through motor $E^1$, conductor 44, to conductor $22^a$, thence to contact pieces $a^5$, $a^x$, $a^8$, and back to battery through conductors 2, $11^b$.

When the button is released, the interrupted circuit through lamp F, and the uninterrupted circuit through lamp D, are broken, and the normally uninterrupted circuit through lamp F, is reëstablished.

When the "left" button is depressed, the interrupted circuit through the tail light lamp may be traced from contact piece $a$ (see Fig. 1) through conductors $11^a$, $11^b$, battery H, conductor 1, branch $1^c$, through lamp F, conductors $1^a$, 22, through the circuit interrupter mechanism, conductor $22^a$, to conductor $22^b$, thence to contact pieces $a^5$, $a$.

The current through the "left" lamp may be traced from contact piece $a$, conductors $11^a$, $11^b$, battery, conductor 1, lamp B, conductor 5, and contact pieces $a^6$, $a$.

To indicate that the driver intends to stop or slow up, he presses both buttons, thereby illuminating both indicating lamps, and sending a series of flashes through the tail light lamp.

From the above, it is readily apparent that the tail light lamp circuit under normal driving conditions, may remain open during daylight, and may be closed at dark, and that the right and left signal lamps may be controlled from their respective buttons, and simultaneously therewith a series of flashes may be emitted by the tail light lamp. Furthermore, that one and the same tail light lamp may be used for illuminating the license plate in the common and well-known manner, when the switch G, is closed, and for sending out flashes when the signal is used.

I claim as new, and desire to secure by Letters Patent:

1. In a signaling system for motor vehicles, "right" and "left" push buttons, "right" and "left" signaling lamps, a tail light lamp, a circuit interrupter, a battery, a circuit for the tail light lamp running through both push buttons and having a switch therein for maintaining a normally closed circuit through said tail light lamp, normally open circuits for said tail light lamp running through said circuit interrupter, and to each push button said push buttons having contact pieces for normally maintaining a closed circuit through said tail light lamp, and for closing either normally open circuit through said tail light lamp, and normally open circuits for said signaling lamps running to their respective buttons.

2. A signaling system for motor vehicles, comprising "right" and "left" push buttons, "right" and "left" signaling lamps, a tail light lamp, a circuit interrupter, a source of electric energy, a main circuit for said tail light lamp, comprising conductors, one of which runs from the tail light lamp to a contact piece of one push button, another of which runs to battery and then branches, and each branch runs to a contact piece of each push button, and a third conductor which runs from one contact piece of one push button to a contact piece of the other push button, there being a switch in said last mentioned conductor, and there being a branch leading from said first mentioned conductor, said branch leading through said interrupter, and thence branching out, the two members of said branch leading to contact pieces of both push buttons, the main circuit normally being closed through said push buttons when said switch is closed, and open when either button is depressed, and the circuits running through the branches being closed when either button is depressed, and circuits for the indicating lamps running through contact pieces of their respective buttons.

3. In a signaling system for motor vehicles, "right" and "left" push buttons, "right" and "left" indicating lamps, a tail light lamp, a source of electric energy and a circuit interrupter, each of said push buttons having a movable contact piece, and one having two contact pieces normally contacting with the movable contact piece, and three contact pieces normally out of contact with said movable contact piece, but contacting therewith when said movable contact piece is depressed, the other push button having one contact piece normally contacting with the movable contact piece of said button, and two contact pieces normally out of contact with the movable contact piece but contacting therewith when the movable contact piece is depressed, a main circuit for said tail light lamp, comprising one conductor running from said lamp to one of the normally contacting contact pieces of one push button, and one conductor running from said lamp to battery, and thence branching, one branch running to a contact piece of one push button, which is normally out of contact with the movable contact piece, the other branch running to the movable contact piece of the other push button, and a third conductor, running between a contact piece of each push button which is normally in contact with said movable contact piece, a switch in said last mentioned conductor, a branch conductor leading from said first mentioned conductor, through said circuit interrupter, and then branching into two branches, each branch running to a contact piece of the buttons, normally out of contact with the movable contact piece, and lamp circuits for each lamp running to contact pieces in the respective buttons which are normally out of contact.

4. A signaling system for motor vehicles, comprising "right" and "left" push buttons, "right" and "left" signaling lamps, a tail light lamp, an electric motor operated, circuit interrupter, a source of electric energy, a main circuit for said tail light lamp, comprising conductors, one of which runs from the tail light lamp to a contact piece of one push button, another of which runs to battery and then branches, and each branch runs to a contact piece of each push button, and a third conductor which runs from one contact piece of one push button to a contact piece of the other push button, there being a switch in said last mentioned conductor, and there being a branch leading from said first mentioned conductor, said branch leading through said interrupter, and thence branching out, the two members of said branch leading to contact pieces of both push buttons, the main circuit normally being closed through said push buttons when said switch is closed, and open when either button is depressed, and the circuits running through the branches being closed when either button is depressed, and circuits for the indicating lamps running through contact pieces of their respective buttons.

5. A signaling system for motor vehicles, comprising "right" and "left" push buttons, "right" and "left" signaling lamps, a tail light lamp, an electric motor operated circuit interrupter, a source of electric energy, a main circuit for said tail light lamp, comprising conductors, one of which runs from the tail light lamp to a contact piece of one push button, another of which runs to battery and then branches, and each branch runs to a contact piece of each push button, and a third conductor which runs from one contact piece of one push button to a contact piece of the other push button, there being a switch in said last mentioned conductor, and there being a branch leading from said first mentioned conductor, said branch leading through said interrupter, and thence branching out, the two members of said branch leading to contact pieces of both push buttons, the main circuit normally being closed through said push buttons when said switch is closed, and open when either button is depressed, and circuits for the indicating lamps, running through contact pieces of their respective buttons, and a branch circuit for the motor of said circuit interrupter branching from the interrupter circuit.

MAX A. MILLER.